United States Patent
Taubenheim et al.

(10) Patent No.: US 6,198,779 B1
(45) Date of Patent: *Mar. 6, 2001

(54) METHOD AND APPARATUS FOR ADAPTIVELY CLASSIFYING A MULTI-LEVEL SIGNAL

(75) Inventors: David B. Taubenheim, Boynton Beach; Brian T. Kelley; David M. Johnson, both of Delray Beach, all of FL (US)

(73) Assignee: Motorola, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/305,701

(22) Filed: May 5, 1999

(51) Int. Cl.[7] ................................................. H03K 9/00
(52) U.S. Cl. .......................... 375/316; 375/286; 375/287
(58) Field of Search ................................. 375/264, 284, 375/286, 287, 316, 317, 320, 330, 289; 329/300, 304, 311, 347; 714/810; 455/226.1

(56) References Cited

U.S. PATENT DOCUMENTS

| | | | |
|---|---|---|---|
| 5,521,941 | * 5/1996 | Wiatrowski et al. | 375/287 |
| 5,818,875 | * 10/1998 | Suzuki et al. | 375/261 |
| 5,825,243 | * 10/1998 | Sato et al. | 329/311 |
| 5,832,038 | * 11/1998 | Carsello | 375/316 |
| 5,838,741 | * 11/1998 | Callaway, Jr. et al. | 375/346 |
| 6,055,282 | * 4/2000 | Hughes et al. | 375/340 |
| 6,084,931 | * 7/2000 | Powell, II et al. | 375/355 |

* cited by examiner

*Primary Examiner*—Chi H. Pham
*Assistant Examiner*—Emmanuel Bayard

(57) ABSTRACT

A radio receiver circuit (200) is used for receiving a multi-level signal (201) that includes a plurality of symbols, wherein each level is representative of a symbol of data. Baseband samples are generated for each symbol, whereby each baseband sample has a phase and a signal level. The radio receiver circuit (200) measures the received signal environment. A digital circuit (212) selects a scan duration from a scan duration table (251) based on the measured signal environment and a combination of signal types used for classification of the received signal. The digital circuit tallies, by category, occurrences of the baseband samples, whereby each category is representative of one of a plurality of phases, and one of a plurality of signal level ranges. The digital circuit (212) selects a set of optimized thresholds from a table of predetermined, optimized thresholds (252), based on the measured signal environment and a combination of signal types, and correlates the tallies to at least one template, and classifies the multi-level signal according to the correlation results and the selected optimized thresholds.

21 Claims, 5 Drawing Sheets

METHOD AND APPARATUS FOR ADAPTIVELY CLASSIFYING A MULTI-LEVEL SIGNAL

FIELD OF THE INVENTION

This invention relates in general to receiving multi-level radio signals, and particularly to the fast, reliable classification of multi-level signals.

BACKGROUND OF THE INVENTION

With the proliferation of signaling protocols, many radio communication systems today modulate messages using a hybrid of multi-level signaling techniques such as, for example, 2-level FSK (frequency shift keyed) signaling, and 4-level FSK signaling. Each technique can have multiple baud rates such as, for example, 4-level FSK signaling at 6400 bits per second (bps), 3200 bps, or 1600 bps, and 2-level FSK signaling at 3200 bps or 1600 bps. Moreover, each technique may also have multiple frequency deviations for each symbol of data, e.g., a 4-level FSK signal can have deviations at ±800 Hz and ±2400 Hz, or at ±1600 Hz and ±3200 Hz.

In practice, a selective call receiver (SCR) that receives messages from the communication system is sometimes required to scan for a control channel that transmits messages in a signaling format consistent with that used by the SCR. Traditionally, the SCR uses baud rate detection to determine if a proper signal is present on a given channel by examining a short burst of a signal transmitted by the radio communication system. This method allows the SCR to quickly detect if a channel has an active signal.

However, this method requires that symbol levels of a multi-level signal be known in order to examine zero crossings of the recovered waveform. The zero crossings are used to detect the symbol rate of the signal, i.e., its baud rate. Because signal levels are traditionally derived from the received signal, the baud rate detection process is data-dependent, and at times subject to error. For example, an error can occur when a long string of identical symbols is received. In this situation, the baud rate detector is unable to determine the levels of the multi-level signal, and therefore cannot determine the location of the zero crossings to calculate a baud rate. Moreover, the performance of a traditional baud rate detector is further degraded by spreading of the zero crossings due to an inherent characteristic of multi-level signals. Furthermore, traditional baud rate detection cannot classify a multi-level signal by its frequency deviations. That is, it may provide the same result for a 4-level FSK signal having frequency deviations at ±800 Hz and ±2400 Hz, or at ±1600 Hz and ±3200 Hz. Hence, the SCR may incorrectly intercept a 4level FSK signal with the wrong frequency deviations.

Finally, although signaling protocols such as the well known FLEX® signaling protocol provide an indicator of the signaling characteristics (speed and levels) of a frame at the beginning of each frame, using this indicator in a scanning situation would require finding and awaiting the beginning of a frame for each channel being scanned, a task that is made impractical when the control channel has not yet been identified and a task that would be slow even if a the control channel has been identified.

More recently, a technique for classifying a multilevel signal according to its level and baud rate has been described, in U.S. Pat. No. 5,832,038, entitled "METHOD AND APPARATUS FOR CLASSIFYING A MULTI-LEVEL SIGNAL", issued to Carsello on Nov. 3, 1998, and assigned to the assignee hereof. In the description of Carsello, a multi-level signal that is one of a predetermined set of signal types having two predetermined levels and two predetermined baud rates is classified as to its levels and baud rate. The classification is achieved by receiving the multi-level signal; demodulating the multi-level signal to provide baseband samples for each symbol (each baseband sample having a phase and a signal level), and classifying the signal type of the multi-level signal from the phases and signal levels of the baseband samples. The classification of the signal as to type of level (e.g., 4 level versus 2 level) is achieved by steps of tallying, correlating, and determining the signal type.

In the step of tallying, a tally is made, by category, of occurrences of the baseband samples, wherein each category is representative of one of a plurality of phases, and one of a plurality of signal level ranges. This is illustrated in FIG. 1, which is a histogram of 1728 simulated baseband samples of a 4 level signal modulated at 3200 symbols per second (sps) with frequency deviations of ±800 Hertz (Hz) and ±2400 Hz, as impacted by random noise. The symbols in this example are sampled 6 times per symbol, for a total duration of 90 milliseconds. The histogram has three axes: a first horizontal axis labeled TIMING PHASE having 6 phases, a second horizontal axis labeled SIGNAL LEVEL (Hz) that covers 800 Hz intervals from −6400 Hz to +6000 Hz, and a vertical axis labeled NUMBER OF OCCURRENCES having values for tallies up to 80. FIG. 1 is taken from FIG. 2 of Carsello, and is described in more detail in Carsello, column 3, line 24 to column 4, line 53.

In a first step of correlating, a correlation is made by phase and frequency of the category tallies to a desired template. In the description in Carsello, the desired template is a binary word that represents frequency intervals at which frequency deviations of a desired received signal are expected. In the example described, the desired template is $W_4=[11001100110011]$, in which each bit of the desired template represents a 400 Hz interval. The 1's represent frequency intervals within which frequency deviations of baseband samples of the desired signal are expected to occur when the desired signal is received with little or no noise. The 0's represent frequency intervals within which frequency deviations of baseband samples of the desired signal are expected not to occur when the desired signal is received with little or no noise. The correlation is made using the following function $$C_4(\theta, k) = \sum_{s=0}^{13} w_4(s)h(\theta, s+k),$$

in which $\theta$ is the phase (values of 0 through 5), $k$ is a in which θ is the phase (values of 0 through 5), k is a variable that represents a multiple of a 400 Hz frequency offset between the carrier frequency of the received signal and an internal reference frequency, s represents a multiple of 400 Hz intervals in a range of the expected frequency deviations, and h(θ,s+k) represents the tallied values of the histogram. The result of this correlation calculation, $C_4(\theta,k)$, can be presented as a histogram, which normally has a peak at an optimum phase, $\theta^*_4$, and offset, $k^*_4$, when the received signal is sufficiently undistorted.

In a second step of correlating, a correlation is made by phase and frequency of the category tallies to an undesired template. The undesired template is a binary word that represents frequency intervals at which frequency deviations of an undesired received signal are expected. In the description of Carsello, the undesired signal is one of the predetermined set of signal types. In the example described, the undesired template is $W_2=[1111000000001111]$, in which each bit of the undesired template represents a 400 Hz interval. The 1's represent frequency intervals within which frequency deviations of baseband samples of the undesired signal are expected to occur when the undesired signal is received with little or no noise. The 0's represent frequency intervals within which frequency deviations of baseband samples of the undesired signal are expected not to occur when the undesired signal is received with little or no noise. The correlation is made using the following function:

$$C_2(\theta, k) = \sum_{s=0}^{15} w_2(s) h(\theta, s+k),$$

in which $\theta$, $k$, $s$, and $h(\theta,s+k)$ represent the same variables and function as for $C_4(\theta,k)$. The result of this correlation calculation, $C_2(\theta,k)$, can be presented as a histogram, which normally has a peak at an optimum phase, $\theta^*_2$, and optimum offset, $k^*_2$, when the received signal is sufficiently undistorted.

In the step of determining, the signal type of the multi-level signal is determined by its level (i.e., 4 level versus 2 level) according to the correlation results. The determination is made by comparing a maximum value of $C_4(\theta,k)$ to a first predetermined threshold and by comparing a maximum value of $C_2(\theta,k)$ to a second predetermined threshold. The first and second predetermined thresholds are values above which the maximum values of the correlation results will occur to a high probability when the radio frequency (RF) input power, respectively, of the desired signal or undesired signal is sufficient. When the maximum value of $C_4(\theta,k)$ is less than or equal to the first predetermined threshold (thereby failing to substantially match the desired template), or the maximum value of $C_2(\theta,k)$ is greater than or equal to the second predetermined threshold (thereby substantially matching the undesired template), the received signal is rejected as not being of the desired signal level type (which is 4 level in the example). Otherwise, the received signal is accepted as being of the desired signal level type.

Carsello further describes classifying the received signal as to type of baud rate (e.g., 1600 baud versus 3200 baud). To achieve this, an even baud rate function and an odd baud rate function are described. These functions are:

$$B_{3200,e}(\theta) = \sum_{n_{even}} |s(6n+\theta) - s(6n+\theta)|, \text{ and}$$

$$B_{3200,o}(\theta) = \sum_{n_{odd}} |s(6n+\theta) - s(6n-6+\theta)|,$$

wherein n is a symbol index, $s(6n+\theta)$ is a signal level of a baseband sample at a particular phase or a selected symbol, and $s(6n-6+\theta)$ is a signal level of a baseband sample at the same phase for an immediately preceding (i.e., adjacent) symbol. The symbol index n is selected to skip every other symbol in the total batch of symbols accumulated in a sampling window of 90 ms. Recalling that the total batch of symbols in the example used in Carsello is 288, $n_{even}$ represents 144 even symbols in the batch of 288 symbols, while $n_{odd}$ represents 144 odd symbols in the same batch. The principle behind the baud rate classification technique is that at least one of the plurality of summations generated by $B_{3200,e}(\theta)$ and $B_{3200,o}(\theta)$ will have a substantially low result when a received signal has a baud rate that is an undesired submultiple such as, for example, 1600 baud, when $\theta=\theta^*$, and a desired signal is 3200 baud. The determination is made by comparing a minimum value of the plurality of summations to a third predetermined threshold, which is a value below which the minimum value of the baud rate correlation results will occur with a high probability when the RF input power of a signal having an undesired baud rate is sufficient.

The technique described in Carsello is excellent for classifying a received signal as a selected one of the predetermined set of multilevel signals by using a fixed number of samples. However, it does not describe a technique to minimize the number of symbols, and therefore, the time needed, to classify the signal, nor does it account for affects such as a spurious signal occurring within the bandwidth of the desired signal or signals. Thus, what is needed is a method and apparatus that allows a selective call receiver to properly classify, by its baud rate and signal levels, a multi-level signal that is compatible with the SCR in an optimally short time.

DESCRIPTION OF THE PREFERRED EMBODIMENT

Figure 2:
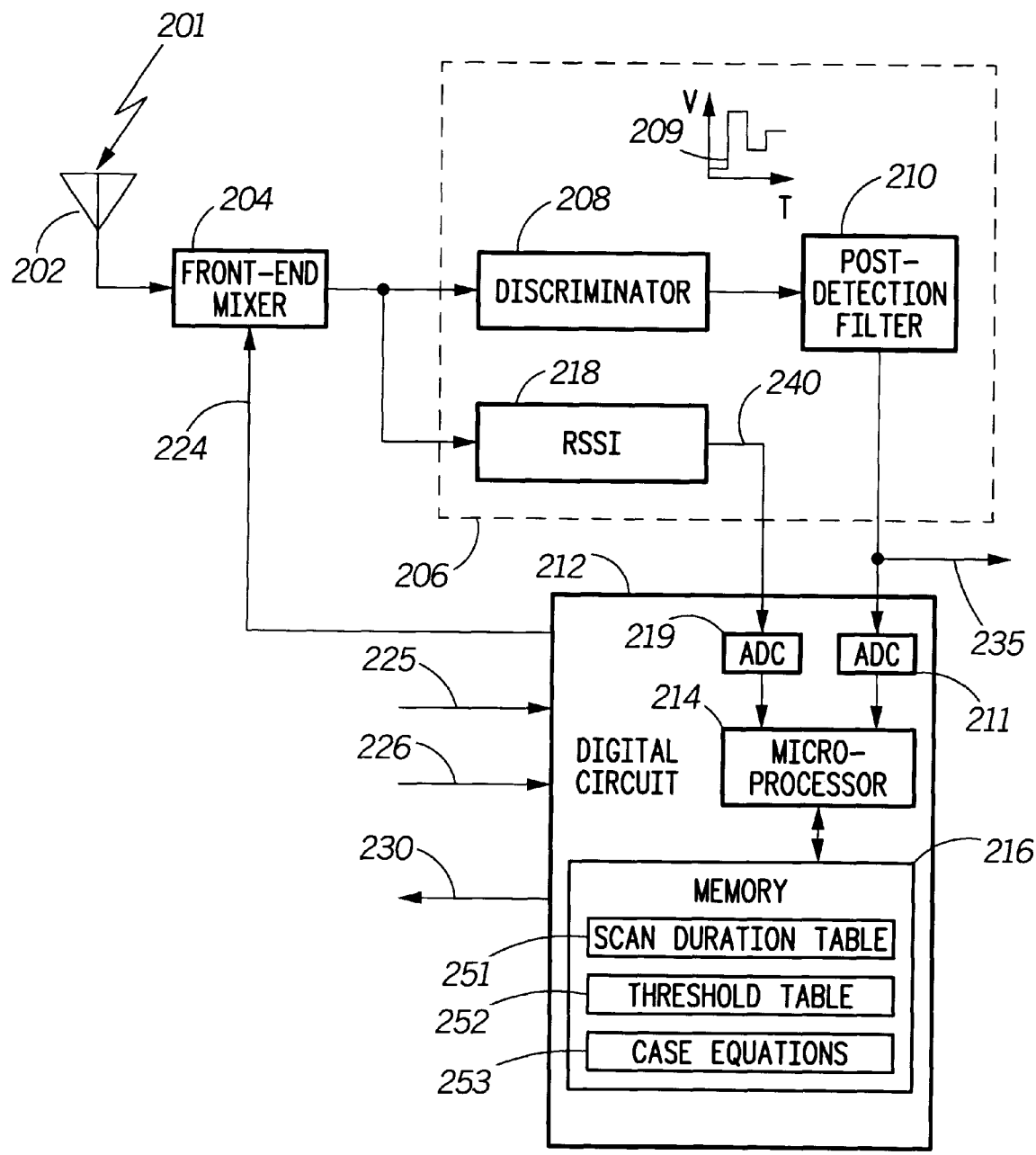
FIG. 2 is an electrical block diagram of a radio receiver circuit according to the present invention.

Referring to FIG. 2, an electrical block diagram of a radio receiver circuit 200 is shown, in accordance with the preferred embodiment of the present invention. The radio receiver circuit 200 comprises a conventional radio antenna 202, a conventional front-end mixer 204, a conventional demodulator circuit 206, and a unique digital circuit 212 for receiving a multi-level signal 201 from a radio communication system, in which each level is representative of a symbol of data and wherein the multi-level signal 201 comprises a plurality of symbols. The demodulator circuit 206 comprises a conventional discriminator 208, a conventional post-detection filter 210, and a conventional RSSI (received signal strength indicator) circuit 218.

Figure 3:
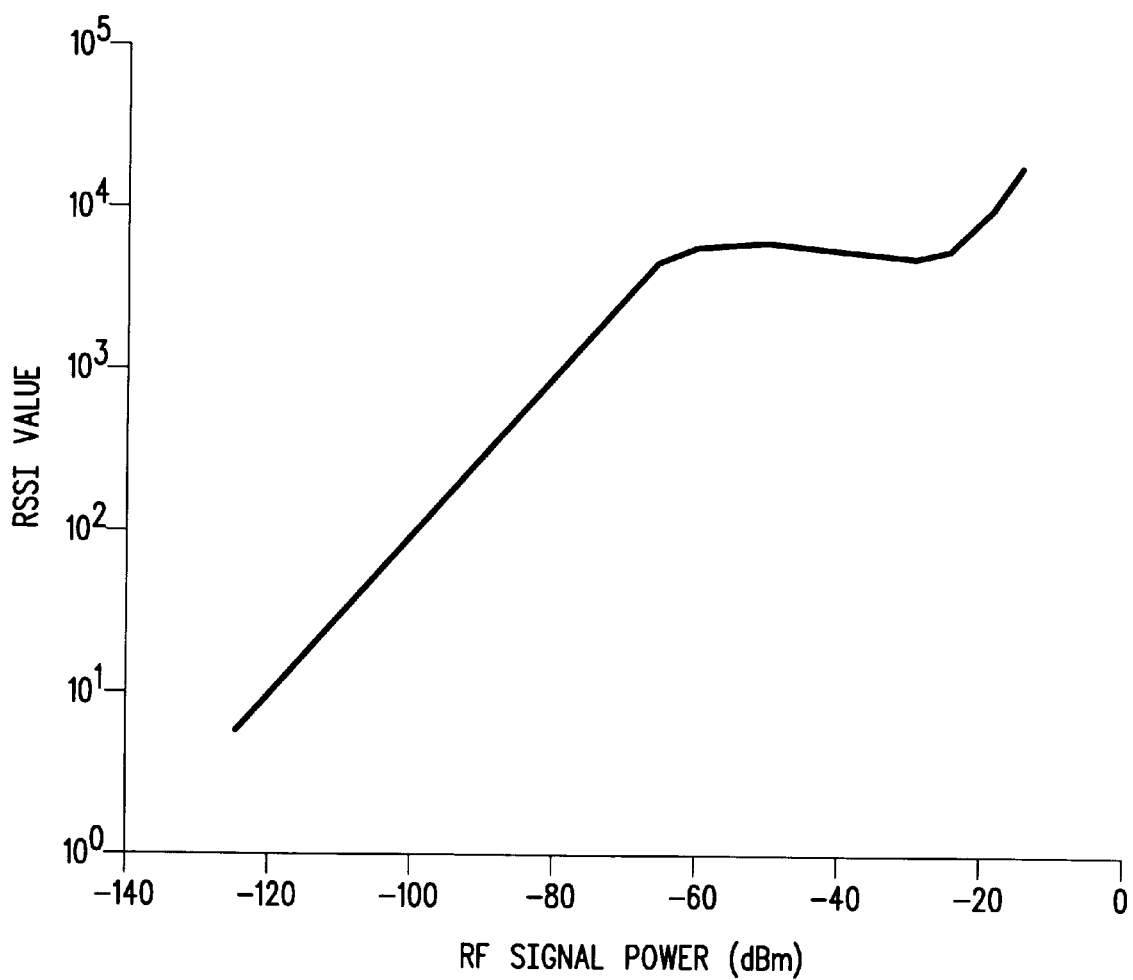
FIG. 3 is a graph depicting a measured signal power versus an RSSI (received signal strength indication) that is obtained by the radio receiver circuit.

The radio antenna 202 intercepts an RF (radio frequency) multi-level signal 201 on a radio channel selected by channel control signal 224 that is generated by the digital circuit 212 in response to a channel selection signal 225 at an input of the digital circuit 212, and provides a corresponding electrical signal to the front-end mixer 204. The front-end mixer 204 uses conventional means, well known in the art, to convert the carrier frequency of the multi-level signal 201 and thereby generate an IF (intermediate frequency) signal that is coupled to the discriminator 208 and the RSSI circuit 218. The discriminator 208 transforms the IF signal to a multi-level voltage output signal 209. FIG. 2 depicts the signal 209 as a 4-level signal, but it can be 2 level in accordance with the preferred embodiment or, for example, other multiples such as 8 levels in other embodiments. The post-detection filter 210 filters the output of the discriminator 208 to eliminate high frequency noise, generating a demodulated signal 235. The RSSI circuit 218 continuously generates an analog RSSI signal 240 having a value that is related to the received signal power, as depicted in FIG. 3.

The demodulated signal 235 and the output of the RSSI circuit 218 are processed by the digital circuit 212. This is accomplished by sampling the demodulated signal 235 and the analog RSSI signal 240 with ADCs (analog-to-digital converters) 211, 219 included in the digital circuit 212. The ADC 219 generates a digitized RSSI value from the analog RSSI signal 240 at the beginning of the process of adaptively classifying the received signal 201. This digitized RSSI value represents the received signal power at the time the baseband sample is taken, so it is said to represent the measured signal power. The ADC 211 generates values that represent baseband voltage samples for each symbol of the multi-level signal 201. It will be appreciated that other conventional circuit architectures could be used to provide these same signals.

As will be described below, the digital circuit 212 is used for adaptively classifying the multi-level signal 201 intercepted by the radio receiver circuit 200 in a unique manner, using the measured RSSI values generated by the ADC 219 and a query signal 226 that is coupled to an input of the digital circuit 212. The adaptive classification includes determining the type of signal as identified by the number of signal levels (e.g., 2-level, 4-level, 8-level, etc.) and the baud rate (e.g., 1600 sps (symbols per second), 3200 sps, etc.) of the multi-level signal 201.

The digital circuit 212 accomplishes the adaptive classification using a software algorithm. The software algorithm is operated from a conventional microprocessor 214 that is coupled to a conventional memory 216 that are both included in the digital circuit 212. The digital circuit 212 processes the output of the ADC 211 according to the preferred embodiment of the present invention. The memory 216 is a conventional non-volatile random access memory (RAM) that includes a unique pattern of conventional program instructions and data that control the microprocessor 214 to perform the processing of the output of the ADC 211. The memory 216 includes a scan duration table 251, a threshold table 252, and a set of case equations 253 described in more detail below. Alternatively, the microprocessor 214 and memory 216 can be replaced with a unique algorithmic state machine, which is contained in an ASIC (application specific integrated circuit) that includes the scan duration table 251 and the threshold table 252 in a memory. In an ASIC embodiment, the power efficiency of the digital circuit 212 is typically better than that of the microprocessor 214 and memory 216 combination.

The discussions that follow are focused on the process of adaptively classifying the received signal 201 as one or more of the well known ReFLEX™ signal types (more generically called "a combination of desired signal types"), which are multilevel signals having either 2 or 4 levels, at deviations of ±800 Hz (Hertz) and ±2400 Hz referenced to a common carrier (e.g., 900 MHz), and at a baud rate of 1600 sps or 3200 sps. The adaptive classification is performed in a situation in which the only signals that are likely to be intercepted by the radio receiver circuit 200 are one of the ReFLEX™ signals, one of the well known FLEX™ signal types, and/or a spurious signal. The FLEX™ signal types are multilevel signals having either 2 or 4 levels, at deviations of ±1600 Hz (Hertz) and ±2400 Hz, and at a baud rate of 1600 sps or 3200 sps. Rapidity and accuracy of classification of the signal type is important because the radio receiver circuit 200 is used in a scanning operation. It will be appreciated, however, that once the unique aspects of the digital circuit 212 are understood, the invention can be modified by one of ordinary skill in the art to detect other levels and other baud rates of an FSK multi-level signal. Moreover, it should be understood that the digital circuit 212 can be adapted to other signaling formats such as, for example, a multi-level QAM (quadrature amplitude modulation) signal, and multi-level PSK (phase shift keyed) signal. When the digital circuit 212 has determined a classification of the received signal 201 using the adaptive process described herein, the result is reported in a classification signal 230.

Figure 4:
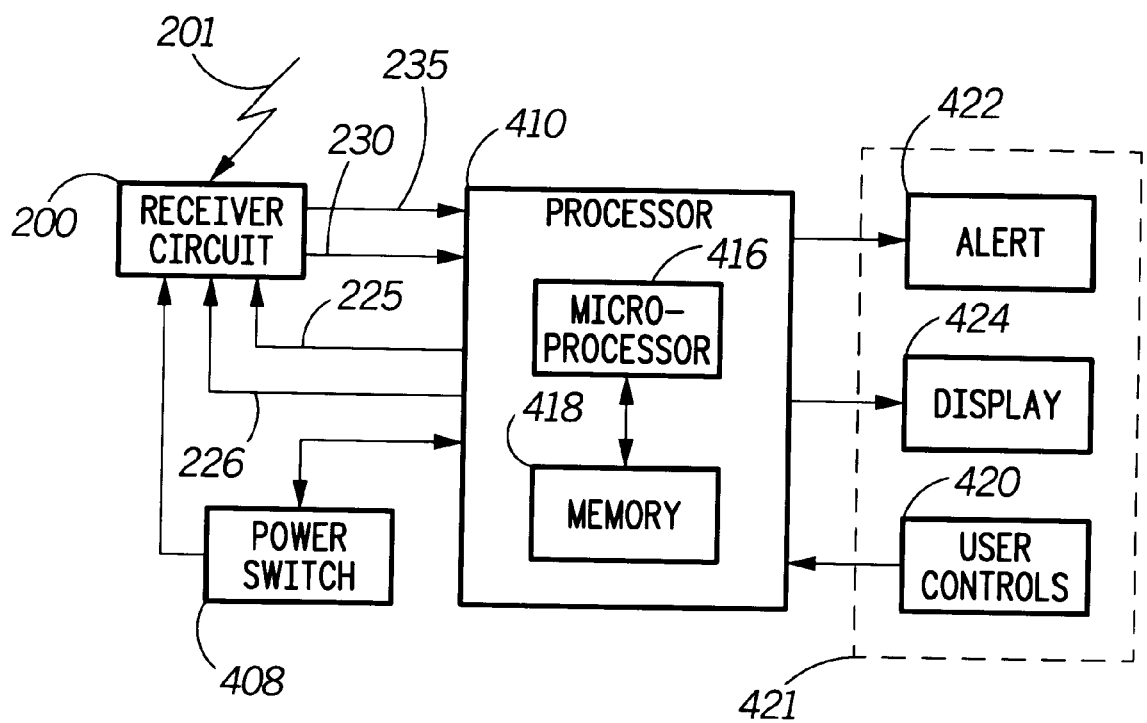
FIG. 4 is an electrical block diagram of a selective call radio (SCR) utilizing the radio receiver circuit of FIG. 2.

Referring to FIG. 4, an electrical block diagram of a selective call receiver (SCR) 400 utilizing the radio receiver circuit 200 is shown, according to the preferred embodiment of the present invention. The SCR 400 comprises a power switch 408, the radio receiver circuit 200, a processor 410, and a user interface 421. The radio receiver circuit 200 is utilized for receiving messages transmitted by a radio communication system and operates in the manner described above. It will be appreciated that the digital circuit 212 can be implemented by the elements of the processor 410 under software control.

The power switch 408 is a conventional switch, such as a MOS (metal oxide semiconductor) switch for controlling power to the radio receiver circuit 200 under the direction of the processor 410, thereby providing a battery saving function.

The processor 410 is used for controlling operation of the SCR 400. Generally, its primary function is decode the demodulated signal 235 provided by the radio receiver circuit 200 and process received messages from the decoded signal, storing them and alerting a user of each received message. To perform this function, the processor 410 comprises a conventional microprocessor 416 coupled to a conventional memory 418 having nonvolatile and volatile memory portions, such as a ROM (read-only memory) and RAM. One of the uses of the memory 418 is for storing messages received from the radio communication system. Another use is for storing one or more selective call addresses utilized in identifying incoming personal or group messages to be processed by the SCR 400.

The SCR 400 operates in a multichannel environment and at times is advantageously operated in a channel scan mode. For example, when the SCR 400 is powered up or when the SCR 400 is taken out of range of a signal it has been receiving, it is then advantageous to scan a predetermined set of channels to determine by which one it should be controlled. To this end, the processor 410 operates to select a radio channel by generating the channel selection signal 225, by generating a query signal that is used by the radio receiver circuit 200 in conjunction with the power measurement to adaptively classify the received signal 201, and by receiving the classification signal 230 from the radio receiver circuit 200 which gives the result. When the result indicates a desirable signal, the processor 410 stops the channel scan process and attempts to receive messages while on the channel at which it is stopped, using the demodulated signal 235 to do so. Otherwise, the processor 410 continues scanning all channels in the predetermined set of channels, then shuts down for a predetermined duration if no acceptable signal is found, to save battery life. Quickly classifying a received signal is therefore an important means of conserving battery life, because if a signal can be quickly classified as an undesired signal, the SCR 400 can move on to the next channel as soon as the signal is determined to be undesired, and the time to scan all channels is reduced. The unique technique of adaptively classifying the signal described herein saves battery life by minimizing the scan durations.

When a signal has been classified as being of a desired type, then the SCR 400 stays on the channel until it is determined whether the channel is an acceptable channel for other reasons, such as whether it is a control channel for the SCR 400. When a message has been decoded and determined to be for the SCR 400, and the message is stored in the memory 418, the processor 410 activates the alerting device 422 (included in the user interface 421) which generates a tactile and/or audible alert signal to the user. The user interface 421, which further includes, for example, a conventional LCD display 424 and conventional user controls 420, is utilized by the user for processing the received messages. This interface provides options such as reading, deleting, and locking of messages. Alternatively, other types of user interfaces can be used, e.g., a conventional audio interface with or without an LCD.

Figure 5:
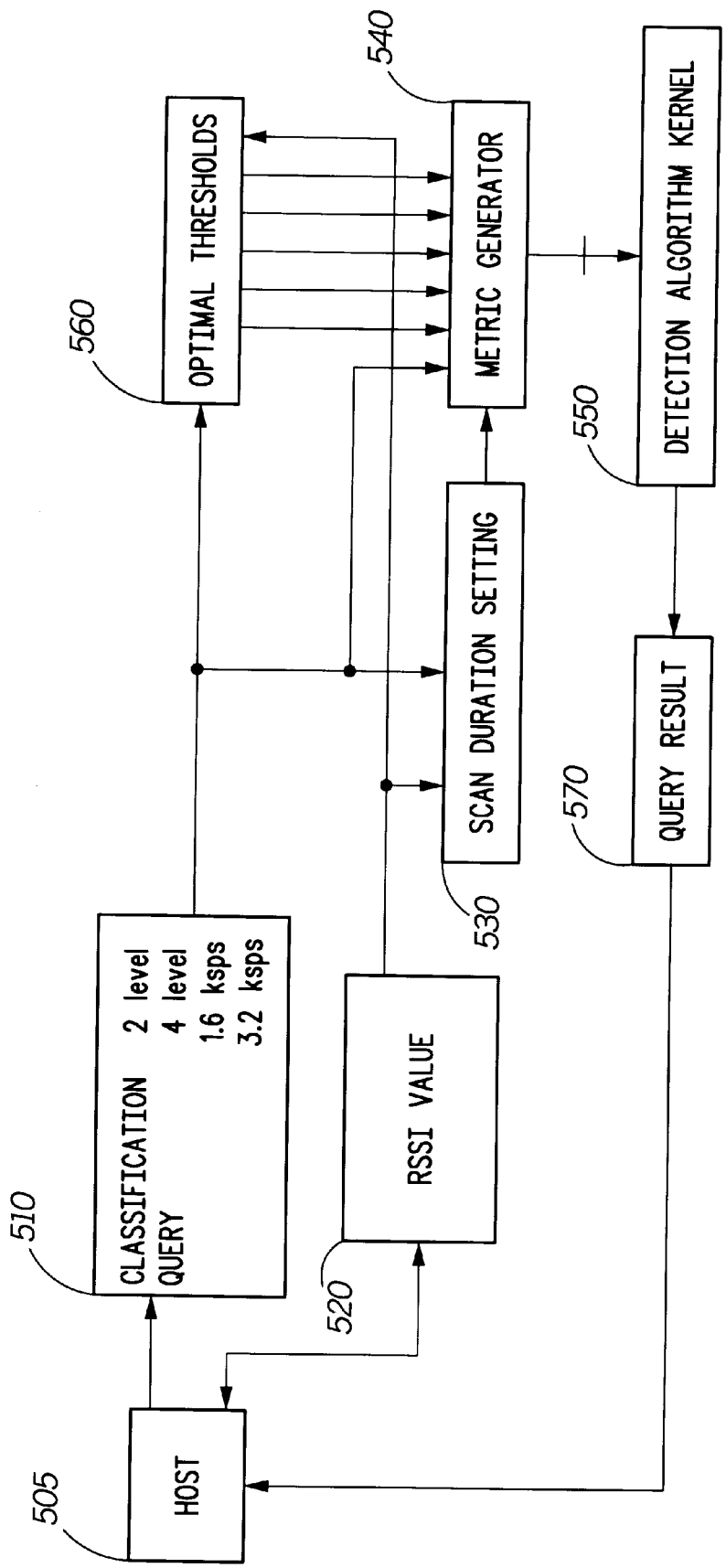
FIG. 5 is a functional block diagram of a classification operation performed in the SCR, in accordance with the preferred embodiment of the present invention.

Referring to FIG. 5, a functional block diagram of the classification operation is shown, in accordance with the preferred embodiment of the present invention. A HOST 505, which in this embodiment is the processor 410, generates the query signal 226, which identifies a CLASSIFICATION QUERY 510. The received signal 201 is to be classified as a member of, or a non-member of a combination of desired signal types. The CLASSIFICATION QUERY 510 identifies the combination, and is also referred to as a query of signal types. For example, the CLASSIFICATION QUERY 510 can be for 1600 sps signals of 2 or 4 levels, having ReFLEX FSK deviations (a set of two types of signals). The "combination" in the CLASSIFICATION QUERY 510 can be, and often is, for a single signal, such as a 3200 sps 2 level signal having ReFLEX FSK deviations. Upon receipt of the CLASSIFICATION QUERY 510 the digital circuit 212 determines the digitized value that represents the signal power at that time. This is represented by the RSSI VALUE functional block 520 in FIG. 5. Using the digitized value that represents the RSSI signal 240 and the CLASSIFICATION QUERY 510 as inputs, the digital circuit 212 determines an optimum scan duration during which to receive and sample the signal 201 on the then selected channel. This is represented by the SCAN DURATION SETTING functional block 530 in FIG. 5. This is done by consulting the scan duration table 251. Contents of the scan duration table 251 are shown in Table 1 for the example being described herein, in which the combination of desired signals in the CLASSIFICATION QUERY 510 is one or more ReFLEX signal types. It will be appreciated that the representation in Table 1 does not represent the physical organization of memory contents in the memory 216. The scan duration table 251 is a preferably a conventional two dimensional RAM and the data is organized in the RAM in a manner, well know to one of ordinary skill in the art, that optimizes the simplicity and speed of obtaining the outputs. The contents of Table 1 are based on computer simulations of the performance of these signaling schemes. For ease of interpretation, the columns of the example scan duration table 251 shown in Table 1 are labeled with the measured signal power in decibels reference to milliwatts (dBm) rather than with the digitized value that represents the signal power. The scan duration is shown in milliseconds (msec), and the contents of the result cells (shown in bold) are reliability percentages. In Table 1, a reliability of 100% actually represents a reliability of "greater than 99%". Cells of Table 1 for which the reliability is below 50% are left blank.

TABLE 1

|         |        | −127 dBm | −123 dBm | >−90 dBm |
|---------|--------|----------|----------|----------|
| 90 msec | 1600:2 | 100      | 100      | 100      |
|         | 1600:4 | 100      | 100      | 100      |
|         | 3200:2 | 100      | 100      | 100      |
|         | 3200:4 | 80       | 100      | 100      |
| 50 msec | 1600:2 | 100      | 100      | 100      |
|         | 1600:4 | 100      | 100      | 100      |
|         | 3200:2 | 100      | 100      | 100      |
|         | 3200:4 | 75       | 98       | 100      |
| 30 msec | 1600:2 | 100      | 100      | 100      |
|         | 1600:4 | 97       | 100      | 100      |
|         | 3200:2 | 100      | 100      | 100      |
|         | 3200:4 | 84       | 98       | 100      |
| 25 msec | 1600:2 | 100      | 100      | 100      |
|         | 1600:4 | 96       | 100      | 100      |
|         | 3200:2 | 100      | 100      | 100      |
|         | 3200:4 | 75       | 89       | 100      |
| 20 msec | 1600:2 | 100      | 100      | 100      |
|         | 1600:4 | 96       | 99       | 100      |
|         | 3200:2 | 100      | 100      | 100      |
|         | 3200:4 | 67       | 80       | 97       |
| 15 msec | 1600:2 | 100      | 100      | 100      |
|         | 1600:4 |          |          |          |
|         | 3200:2 | 100      | 100      | 100      |
|         | 3200:4 |          |          |          |
| 10 msec | 1600:2 | 98       | 99       | 99       |
|         | 1600:4 |          |          |          |
|         | 3200:2 | 100      | 100      | 100      |
|         | 3200:4 |          |          |          |
| 5 msec  | 1600:2 |          |          |          |
|         | 1600:4 |          |          |          |
|         | 3200:2 |          | 100      | 100      |
|         | 3200:4 |          |          |          |

The optimum scan duration is selected from the scan duration table 251 by scanning the column having the value that most closely represents the measured signal power (e.g., "−123 dBm") from the shortest scan duration, 5 milliseconds (ms), to the longest scan duration, 90 ms, for each of the signal types in the query being used for classification. The shortest scan time at which a reliability is equal to or greater than an acceptable reliability is the optimum scan time for each signal type. When more that one signal type is in the combination of desired signal types, the optimum scan time is the longest scan time of the combination. As an example of using the scan duration table 251 for a combination of one signal type, for a query in which the acceptable reliability is greater than 99%, the measured signal power is −123 dBm, and the signal type is the 4 level 3200 sps ReFLEX signal, the reliability value 100% is found at a scan time of 50 msec which is therefore the resultant optimum time. As an example of using the scan duration table 251 for a combination of two signal types, for a query in which the acceptable reliability is 97% or better, the measured signal power is −127 dBm, and the signal types are 2 or 4 level 1600 sps ReFLEX signals, both signal types equal or exceed the reliability value of 97% at a scan time of 30 msec, which is therefore the selected scan time. In accordance with the preferred embodiment of the present invention, the reliabilities stored in the scan duration table 251 are established by simulations known to closely model actual measured results, using a predetermined sample rate, or alternatively, by bench tests. In accordance with the preferred embodiment of the present invention, the predetermined sample rate is 32 kHz.

As a next step in the adaptive classification process, the digital circuit 212 controls the radio receiver circuit 200 to receive the intercepted signal 201 for the optimum scan duration. During the scan duration the discriminator 208 generates the demodulated signal 235, from which the ADC 211 generates baseband voltage samples at the predetermined sample rate for the optimum duration.

Figure 1:
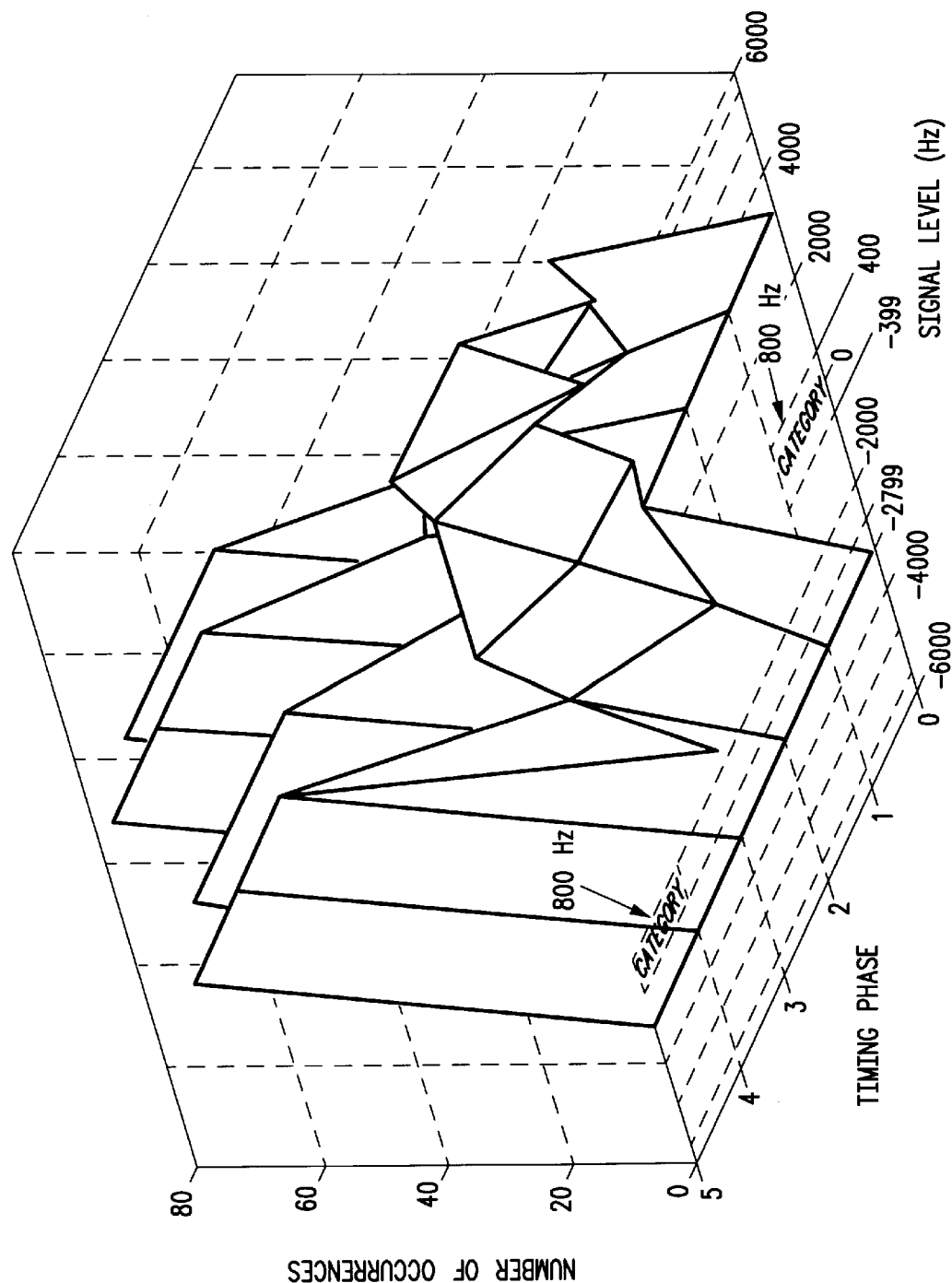
FIG. 1 is a graph depicting a histogram of tallied occurrences for a 6400 bits per second (3200 baud) 4-level FSK signal with no frequency offset.

As a next major step, the digital circuit 212 classifies the signal type of the intercepted signal 201 as being either in or not in the combination of desired signals identified in the CLASSIFICATION QUERY 510, using the measured signal power, the CLASSIFICATION QUERY 510, and the optimum scan time to make the classification. The step of classifying the signal type includes steps of tallying by category, correlating by phase, calculating baud rate functions, and determining the signal type. In step of tallying, the digital circuit 212 tallies, by category, occurrences of the baseband samples wherein each category is representative of one of a plurality of phases, and one of a plurality of signal level ranges, as explained above with reference to FIG. 1. The histogram of tallies of baseband voltage samples of a 3200 sps 4-level FSK signal shown in FIG. 1 is representative of such a tally. In steps of correlating by phase, the digital circuit 212 correlates the categories by phase to at least one desired template, and correlates, by phase, to at least one undesired template and/or a spurious template. The desired and undesired templates are generated from the definitions of the predetermined set of signal types, as described in U.S. Pat. No. 5,832,038, issued to Carsello on Nov. 3, 1998 ("Carsello"), and incorporated herein by reference. In the example used in Carsello, and also for the example discussed herein, two of the templates are as follows:

$w_2$=[1111000000001111], and $w_4$=[11001100110011].

The correlation functions $C_2(\theta,k)$ and $C_4(\theta,k)$ as described by Carsello are calculated using the $w_2$ and $w_4$ templates.

In the example described herein, another template is used that accounts for the 4 level FLEX signal that has deviations of ±1600 Hz and ±2400

$w_F$=[1110000110000001110000111], for which the following correlation function is calculated:

$$C_F(\theta, k) = \sum_{s=0}^{15} w_F(s) h(\theta, s+k)\theta, k, s,$$

and $h(\theta,s+k)$ represents the same variables and function as described for $C_4(\theta,k)$ in Carsello, except that each bit of $w_F$ represents a {400} Hz interval. As in Carsello, the desired template(s) is(are) determined by the combination of desired signal types and the undesired templates are determined by the other signals in the predetermined set of signals.

In accordance with the preferred embodiment of the present invention, a unique template not described by Carsello is also used that accommodates the possibility of a spurious signal on the channel. It is called the spurious template:

$w_{SP}$=[1111000000000000], and is used in a spurious correlation function of:

$$C_{SP}(\theta, k) = \sum_{s=0}^{15} w_{SP}(s) h(\theta, s+k)\theta, k, s,$$

and $h(\theta,s+k)$ represent the same variables and function as for $C_4(\theta,k)$ in Carsello, except that each bit of $w_{SP}$ represents a {400} Hz interval. $C_2(\theta,k)$, $C_4(\theta,k)$, $C_F(\theta,k)$, and $C_{SP}(\theta,k)$ are then determined, which are identified as C2_Corr, C4_Corr, CF_Corr, and CSP_Corr. Associated with C2_Corr and C4_Corr are the specific phases and offsets at which the maximum values occur. These are identified as $\theta^*_2$, $k^*_2$, $\theta^*_4$, and $k^*_4$. This completes the steps of correlating by phase. $B_{3200,e}(\theta^*)$, $B_{3200,o}(\theta^*)$, $B_{1600,e}(\theta^*)$, and $B_{1600,o}(\theta^*)$, are generated by the digital circuit 212 for each maximum phase, $\theta^*_2$ and $\theta^*_4$, using the same type of calculations as described in Carsello, in which a plurality of summation and a plurality of subtractions are calculated, but with the phase multiplier factor changed from 6 to 10 to account for a faster sample rate (32 kHz instead of 19,200 Hz). For example, $B_{3200,e}(\theta^*)$ is determined as:

$$B_{3200,e}(\theta^*) = \sum_{n_{even}} |s(10n + \theta^*) - s(10n - 10 + \theta^*)|$$

Then the minimum of each pair of even and odd baud rate functions, e.g., $B_{3200,e}(\theta^*)$ and $B_{3200,o}(\theta^*)$ is determined. The resulting four values are identified as B3200_2_Value, B3200_4_Value, B1600_2_Value, and B1600_4_Value. It will be appreciated that the number of baud rate functions needed for a combination of signal types in a CLASSIFICATION QUERY 510 is determined by the number of signal types in the combination, and that in a particular selective call radio such as a ReFLEX selective call radio, all combinations can be satisfied by a predetermined set of the baud rate factors. In the example used herein, the set is the four baud rate functions described above.

The steps of correlating by phase and calculating the baud rate functions are collectively represented by the METRIC GENERATOR functional block 540 in FIG. 5

Finally, in the step of determining the signal type, which is represented by the DETECTION ALGORITHM KERNEL functional block 550 in FIG. 5, the eight values determined from the correlation functions and baud rate functions are compared in varying combinations to six predetermined optimized thresholds to determine whether or not the intercepted signal 201 classifies as one of the types in the combination of desired types. For consistency of computation, the eight values determined from the correlation functions, C2_Corr, C4_Corr, CF_Corr, CSP_Corr, B3200_2_Value, B3200_4_Value, B1600_2_Value, and B1600_4_Value, are calculated from the baseband sample values for each CLASSIFICATION QUERY 510 that is made, even though all of them may not be needed for each CLASSIFICATION QUERY 510.

The six predetermined optimized thresholds, C2_Thresh, C4_Thresh, CF_Thresh, CSP_Thresh, B1600 Thresh, and B3200 Thresh, and are selected from a plurality of sets of six predetermined optimized thresholds stored in the threshold table 252. One set of six predetermined optimized thresholds are stored in the threshold table 252 for each scan time and each measured signal power. A representation of the threshold table is shown below in Table 2. It will be appreciated that the representation in Table 2 does not represent the physical organization of memory contents in the memory 216. The threshold table 252 is a preferably a conventional two dimensional RAM and the data is organized in the RAM in a manner, well know to one of ordinary skill in the art, that optimizes the simplicity and speed of obtaining the outputs. Each of the six thresholds is listed for three of the cells in the table, but they are simply identified as sets in the other cells.

TABLE 2

| | −127 dBm | −123 dBm | >−90 dBm |
|---|---|---|---|
| 90 msec | C2_ Thresh (90, −127) C4_ Thresh (90, −127) CF_ Thresh (90, −127) CSP_ Thresh (90, −127) B1600_ Thresh (90, −127) B3200_ Thresh (90, −127) | {Six Thresholds (90, −123)} | C2_ Thresh (90, −90) C4_ Thresh (90, −90) CF_ Thresh (90, −90) CSP_ Thresh (90, −90) B1600_ Thresh (90, −90) B3200_ Thresh (90, −90) |
| 50 msec | {Six Thresholds (50, −127)} | {Six Thresholds (50, −123)} | {Six Thresholds (50, −90)} |
| 30 msec | {Six Thresholds (30, −127)} | {Six Thresholds (30, −123)} | {Six Thresholds (30, −90)} |
| 25 msec | {Six Thresholds (25, −127)} | {Six Thresholds (25, −123))} | {Six Thresholds (25, −90)} |
| 20 msec | {Six Thresholds (20, −127)} | {Six Thresholds (20, −123))} | {Six Thresholds (20, −90))} |
| 15 msec | {Six Thresholds (15, −127)} | {Six Thresholds (15, −123))} | {Six Thresholds (15, −90)} |
| 10 msec | {Six Thresholds (10, −127))} | {Six Thresholds (10, −123)} | {Six Thresholds (10, −90)} |
| 5 msec | {Six Thresholds (5, −127)} | {Six Thresholds (5, −123)} | C2_ Thresh (5, −90) C4_ Thresh (5, −90) CF_ Thresh (5, −90) CSP_ Thresh (5, −90) B1600_ Thresh (5, −90) B3200_ Thresh (5, −90) |

The selection is made by choosing six predetermined optimized thresholds that correspond to the scan time and measured signal power used to select the optimum scan duration. Thus, the predetermined optimized thresholds can be said to be selected by the optimized scan duration and the measured signal power. (In contrast, Carsello uses a fixed scan duration and fixed thresholds.) Uniquely, in accordance with the preferred embodiment of the present invention, the sets of six predetermined optimized thresholds are predetermined for all allowed queries, using combinations of test signal powers and test scan durations that are equivalent to the combinations of measured signal powers and scan durations that are to be used as input values for the scan duration table 251 during any CLASSIFICATION QUERY 510. The selection of a set of six predetermined optimized thresholds from the threshold table 252 is represented by the functional block "OPTIMAL THRESHOLDS" 560 in FIG. 5. The optimum thresholds are determined essentially at the same time that the reliabilities stored in the scan duration table are established. The determination of the predetermined optimum thresholds stored in the threshold table 252 and the corresponding reliabilities stored in the scan duration table 251 is preferably accomplished by using conventional optimization algorithms during field trials or simulations in which the thresholds are varied to achieve best reliability. The thresholds do not vary significantly in response to different signal types at any particular scan duration and measured signal power, so the threshold table does not need the signal type as an input. As a continuation of the example described above with reference to FIG. 5, when the test is for a scan time of 20 msec, the test signal power is −127 dBm, and the test signal type is a 4 level 1600 symbols per second (sps) ReFLEX signal, the best reliability obtained by varying the six thresholds is 96%, which is stored in the scan duration table 251. The six corresponding, predetermined optimum thresholds used to obtain this reliability are stored in the threshold table 252 for the same scan time and measured signal power.

When the correlation values, baud rate values, and optimum thresholds have been determined during a query, they are used in a case of logical equations, the result of which is a logical value, TRUE or FALSE. When the result is TRUE, the received signal 201 has been classified as one of the signal types in the combination of signals in the CLASSIFICATION QUERY 510, and when the result is FALSE, the received signal 201 is not one of the types in the CLASSIFICATION QUERY 510. The result is returned to the HOST 505, in the classification signal 230 generated by the digital circuit 212. This is represented by the QUERY RESULT 570 functional block in FIG. 5. The case of logical equations is one of a set of cases of equations 253 stored in the memory 216 as program instructions. In accordance with the preferred embodiment of the present invention, the set of cases of equations 253 includes nine combinations of signal types that are practical, not all sixteen that are combinatorially possible. In general, the set of cases of equations will not necessarily include all possible signal combinations in alternative embodiments of the present invention. The set of case equations for the preferred embodiment of the present invention are shown below in Table 3.

TABLE 3

| Combination of Signal Types | Case of Equations |
|---|---|
| case 3200:4 | if (C4_Corr > C4_Thresh and C2_Corr < C2_Thresh and B3200_4_Value > B3200_Thresh and CFlex_Corr < CFlex_Thresh) then Pass = True; |
| case 3200:2 | if (C2_Corr > C2_Thresh and CSP_Corr < CSP_Thresh and B3200_2_Value > B3200_Thresh) then Pass = True; |
| case 3200:2 or 3200:4 | if (C2_Corr > C2_Thresh and CSP_Corr < CSP_Thresh and B3200_2_Value > B3200_Thresh) then Pass = True; else if (C4_Corr > C4_Thresh and C2_Corr < C2_Thresh and B3200_4_Value > B3200_Thresh and CFlex_Corr < CFlex_Thresh) then Pass = True; |
| case 1600:4 | if (C4_Corr > C4_Thresh and C2_Corr < C2_Thresh and B1600_4_Value > B1600_Thresh and B3200_4_Value < B3200_Thresh and CFlex_Corr < CFlex_Thresh) then Pass = True; |
| case 1600:2 | if (C2_Corr > C2_Thresh and CSP_Corr < CSP_Thresh and B1600_2_Value > B1600_Thresh and B3200_2_Value < B3200Thresh) then Pass = True; |
| case 1600:2 or 1600:4 | if (C4_Corr > C4_Thresh and C2_Corr < C2_Thresh and B1600_4_Value > B1600_Thresh and B3200_4_Value < B3200_Thresh and CFlex_Corr < CFlex_Thresh) then Pass = True; else if (C2_Corr > C2_Thresh and CSP_Corr < CSP_Thresh and B1600_2_Value > B1600_Thresh and B3200_2_Value < B3200_Thresh) then Pass = True; |

TABLE 3-continued

| Combination of Signal Types | Case of Equations |
|---|---|
| case 3200:4 or 1600:4 | if (C4_Corr > C4_Thresh and<br>C2_Corr < C2_Thresh and<br>(B1600_4_Value > B1600_Thresh or<br>B3200_4_Value > B3200_Thresh) and<br>CFlex_Corr < CFlex_Thresh)<br>then Pass = True; |
| case 3200:2 or 1600:2 | if (C2_Corr > C2_Thresh and<br>CSP_Corr < CSP_Thresh and<br>(B1600_2_Value > B1600_Thresh or<br>B3200_2_Value > B3200_Thresh))<br>then Pass = True; |
| case 3200:2 or 3200:4 or 1600:2 or 1600:4 | if ((C4_Corr > C4_Thresh and<br>C2_Corr < C2_Thresh) and<br>(B1600_Value > B1600_Thresh or<br>B3200_Value > B3200_Thresh ) and<br>CFlex_Corr < CFlex_Thresh)<br>then Pass = True;<br>else if (C2_Corr > C2_Thresh and<br>CSP_Corr < CSP_Thresh and<br>(B1600_Value ><br>B1600_Threshor<br>B3200_Value > B3200_Thresh<br>))<br>then Pass = True; |

It will be appreciated that although the present invention is described above as using a measured signal power as a basis for determining the optimum scan time and thresholds, other parameters that characterize the received signal environment can alternatively or additionally be used. For example, a measurement of the amount of simulcast delay spreading can advantageously be used in addition to measured signal power, or in place of measured signal power when implementation of an RSSI circuit is impractical but software can be developed to perform the other aspects of the present invention. Other parameters that could potentially be measured are multipath distortion and/or fading. Therefore it can be more generically stated that for alternative embodiments of the present invention, the received signal environment is used as a basis for determining the optimum scan time and thresholds.

It will be further appreciated that some of the benefits of the present invention are realized when certain aspects, but not all the unique aspects described above, are included. As a first example, an acceptable reliability could be predetermined for all queries (e.g., 100%), but all other variables would be determined as described above. As a second example, an optimum scan duration can be determined by an acceptable reliability, a measurement of the received signal environment, and the combination of signal types as described above, but a single set of predetermined optimum thresholds could be used for all queries. The scan time in this case would be improved but not as much as when plural sets of predetermined optimum thresholds are used. As a third example, the baud rate factors can be left out. Obviously, the removal of each aspect of the present invention tends to degrade the reliability of the classification decision.

It will be further appreciated that the scan duration tables and threshold tables could be organized in other manners. For example, a table could be constructed that had as inputs a first input that indicated which one of the practical combination of signal types (or cases) the query is for, and second and third inputs that are the measured signal power and the acceptable reliability. This table could then have as outputs the optimum scan duration and thresholds. These other organizations are obvious to one of ordinary skill in the art and provide tradeoffs of memory size and processing speed.

In summary, it will be appreciated that the scan duration is preferably determined based on an acceptable reliability value, a received signal environment, and a combination of signal types that are in the predetermined set of signal types, but can alternatively be based on any one or a combination of these variables. A similar statement is true for the selection of the optimum thresholds.

By now it should be appreciated that a technique for adaptively classifying a signal has been described that minimizes the time required to do so, thereby minimizing scan times and power requirements, and increasing the reliability of the classification. The technique is usable with any device that receives and decodes a digitally encoded multilevel signal, such as a radio receiver or an infra red light receiver used for receiving digital signals.

What is claimed is:

1. In a radio receiver that receives a multi-level signal that is one of a predetermined set of signal types, wherein each level is representative of a symbol of data, and wherein the multi-level signal comprises a plurality of symbols, a method for adaptively classifying the multi-level signal, comprising the steps of:

characterizing a received signal environment;

selecting a scan duration based on at least one of the received signal environment and a query of signal types that are in the predetermined set of signal types;

receiving the multi-level signal for the scan duration;

demodulating the multi-level signal to provide baseband samples for each symbol, each baseband sample having a phase and a signal level; and classifying the signal type of the multi-level signal from the phases and signal levels of the baseband samples.

2. The method as recited in claim 1, wherein in the step of classifying, the classification of the signal type of the multi-level signal is based on at least one of an acceptable reliability, the received signal environment, a query of signal types that are in the predetermined set of signal types, and the scan duration.

3. The method as recited in claim 1, wherein the step of classifying comprises the steps of tallying, by category, occurrences of the baseband samples, wherein each category is representative of one of a plurality of phases, and one of a plurality of signal level ranges;

correlating by phase the categories to at least one desired template; and correlating by phase the categories to at least one undesired template; and determining the signal type of the multi-level signal by its level according to the correlation results.

4. The method as recited in claim 3, wherein in the step of determining, the determination is based on correlation thresholds determined from at least one of the received signal environment and the scan duration.

5. The method as recited in claim 3, wherein the desired and undesired templates are based on the query of signal types.

6. The method as recited in claim 3, wherein the step of determining the signal type comprises:

rejecting the multi-level signal as a member of the query of signal types if a correlation result of each of the plurality of phases fails to substantially match the at least one desired template or if at least one correlation result substantially matches the at least one undesired template, and accepting the multi-level signal as a member of the query of signal types if it is not rejected.

7. The method as recited in claim 6, wherein the step of rejecting the multi-level signal according to the at least one desired template includes:

comparing the at least one correlation result to a correlation threshold determined by at least one of the received signal environment and the scan duration.

8. The method as recited in claim 3, wherein the desired template is representative of a desired multi-level signal that is in the query of signal types; and wherein the undesired template is representative of an undesired multi-level signal that is not is in the query of signal types.

9. The method as recited in claim 1, further adaptively classifying the multi-level signal by its baud rate, comprising the steps of:

calculating a plurality of absolute subtractions, each subtraction corresponding to a difference between a signal level of a baseband sample of one of the plurality of symbols and a signal level of a corresponding baseband sample of an adjacent symbol;

calculating a plurality of summations, each summation corresponding to additions of selected ones of the plurality of absolute subtractions;

selecting at least one summation from the plurality of summations;

determining a lowest value of the at least one summation;

comparing the lowest value to a baud rate threshold; and rejecting the multi-level signal if the lowest value is below the baud rate threshold, wherein the baud rate threshold is based on at least one of the received signal environment and the scan duration.

10. In a radio receiver that receives a multi-level signal that is one of a predetermined set of signal types, wherein each level is representative of a symbol of data, and wherein the multi-level signal comprises a plurality of symbols, a method for adaptively classifying the multi-level signal, comprising the steps of:

characterizing a received signal environment;

receiving the multi-level signal for a scan duration;

demodulating the multi-level signal to provide baseband samples for each symbol, each baseband sample having a phase and a signal level; and classifying the signal type of the multi-level signal according to its level from the phases and signal levels of the baseband samples, based on at least one of the received signal environment, a query of signal types that are in the predetermined set of signal types, and the scan duration.

11. The method as recited in claim 10, further comprising the step of:

selecting the scan duration based on at least one of an acceptable reliability, the received signal environment, and a query of signal types that are in the predetermined set of signal types.

12. The method as recited in claim 10, wherein the step of classifying comprises the steps of tallying, by category, occurrences of the baseband samples, wherein each category is representative of one of a plurality of phases, and one of a plurality of signal level ranges;

correlating by phase the categories to at least one desired template; and correlating by phase the categories to at least one undesired template; and determining the signal type of the multi-level signal by its level according to the correlation results.

13. The method as recited in claim 12, wherein in the step of determining, the determination is based on correlation thresholds determined from at least one of the received signal environment and the scan duration.

14. The method as recited in claim 12, wherein the desired and undesired templates are based on the query of signal types.

15. The method as recited in claim 12, wherein the step of determining the signal type comprises:

rejecting the multi-level signal as a member of the query of signal types if a correlation result of each of the plurality of phases fails to substantially match the at least one desired template or if at least one correlation result substantially matches the at least one undesired template, and accepting the multi-level signal as a member of the query of signal types if it is not rejected.

16. The method as recited in claim 15, wherein the step of rejecting the multi-level signal according to the at least one desired template includes:

comparing the at least one correlation result to a correlation threshold determined by at least one of the received signal environment and the scan duration.

17. The method as recited in claim 12, wherein the desired template is representative of a desired multi-level signal that is in the query of signal types, and wherein the undesired template is representative of an undesired multi-level signal that is not is in the query of signal types.

18. The method as recited in claim 10, further adaptively classifying the multi-level signal by its baud rate, further comprising the steps of:

calculating a plurality of absolute subtractions, each subtraction corresponding to a difference between a signal level of a baseband sample of one of the plurality of symbols and a signal level of a corresponding baseband sample of an adjacent symbol;

calculating a plurality of summations, each summation corresponding to additions of selected ones of the plurality of absolute subtractions;

selecting at least one summation from the plurality of summations;

determining a lowest value of the at least one summation;

comparing the lowest value to a baud rate threshold; and rejecting the multi-level signal if the lowest value is below the baud rate threshold, wherein the baud rate threshold is based on at least one of the received signal environment and the scan duration.

19. In a radio receiver that receives a multi-level signal that is one of a predetermined set of signal types, wherein each level is representative of a symbol of data and wherein the multi-level signal comprises a plurality of symbols, a method for classifying the multi-level signal by its baud rate, comprising:

characterizing a received signal environment;

receiving the multi-level signal for a scan duration;

demodulating the multi-level signal to provide baseband samples for each symbol, each baseband sample having a phase and a signal level;

calculating a plurality of absolute subtractions, each subtraction corresponding to a difference between a signal level of a baseband sample of one of the plurality of symbols and a signal level of a corresponding baseband sample of an adjacent symbol;

calculating a plurality of summations, each summation corresponding to additions of selected ones of the plurality of absolute subtractions;

selecting at least one summation from the plurality of summations;

determining a lowest value of the at least one summation;

comparing the lowest value to a baud rate threshold determined by at least one of the received signal environment and the scan duration; and rejecting the multi-level signal if the lowest value is below the baud rate threshold.

20. In a radio receiver that receives a multi-level signal that is one of a predetermined set of signal types, wherein each level is representative of a symbol of data, and wherein the multi-level signal comprises a plurality of symbols, a method for adaptively classifying the multi-level signal, comprising the steps of:

characterizing a received signal environment;

receiving the multi-level signal for a scan duration;

demodulating the multi-level signal to provide baseband samples for each symbol, each baseband sample having a phase and a signal level;

tallying, by category, occurrences of the baseband samples, wherein each category is representative of one of a plurality of phases, and one of a plurality of signal level ranges;

correlating by phase the categories to at least one desired template; and correlating by phase the categories to a spurious template; and determining the signal type of the multi-level signal by its level according to the correlation results.

21. A radio receiver that receives a multi-level signal that is one of a predetermined set of signal types, wherein each level is representative of a symbol of data, and wherein the multi-level signal comprises a plurality of symbols, comprising:

a digital circuit comprising a scan duration table having an optimum scan duration output selected by at least one of an acceptable reliability, a signal type input and a received signal environment; and a threshold table having an output comprising a set of at least two thresholds that is selected by at least one of a scan duration input and the received signal environment, wherein the digital circuit accepts a query that comprises at least one of the predetermined set of signal types;

selects an optimum scan duration from the scan duration table using at least one of the at least one of the predetermined signal types;

samples the multi-level signal for the scan duration, generating a baseband sample that has a phase and a signal level for each baseband sample;

selects optimum thresholds from the threshold table using the optimum scan duration; and classifies the signal type of the multi-level signal according to its level from the phases and signal levels of the baseband samples, based on at least one of the received signal environment, a query of signal types that are in the predetermined set of signal types, and the scan duration.

* * * * *